Aug. 1, 1950 W. S. GILLMOR 2,517,423

ATTACHING DEVICE FOR PHONOGRAPH REPRODUCER UNITS

Filed July 22, 1947

INVENTOR.
WILLIAM S. GILLMOR
BY Duell & Kane
ATTORNEYS

Patented Aug. 1, 1950

2,517,423

UNITED STATES PATENT OFFICE 2,517,423

ATTACHING DEVICE FOR PHONOGRAPH REPRODUCER UNITS

William S. Gillmor, Glen Cove, N. Y.

Application July 22, 1947, Serial No. 762,577

1 Claim. (Cl. 274—24)

This invention relates to a sound reproducer unit or cartridge having improved means for attaching it to the pick-up arm of a phonograph.

Due to variations in the size, shape and arrangement of phonograph pick-up arms, difficulty has been encountered in providing reproducer units or cartridges which will properly fit all types of pick-up arms. In this connection the distance from the mounting holes in the arms to the ends of the arms vary considerably. Also there is considerable variation in the distance between the mounting holes and the stylus point in different pick-up units and arms. All of these variations affect the tracking angle which, in turn, has an important effect upon distortion.

It is an object of the present invention to overcome these difficulties and to provide an improved attaching device for coupling phonograph reproducer units or cartridges to pick-up arms of many different sizes, shapes and types. The arrangement is such that it is adapted for use with a wide variety of pick-up arms and provides for a relatively wide range of adjustment so that tracking error can be minimized and the desired tracking angle can readily be obtained.

A further object of the invention is the provision of an improved attaching device for sound reproducers which is relatively inexpensive to manufacture, simple to install and use and will give satisfactory service over a long period of time.

Figures 1, 2, 3, 4, 5, 6, 7:
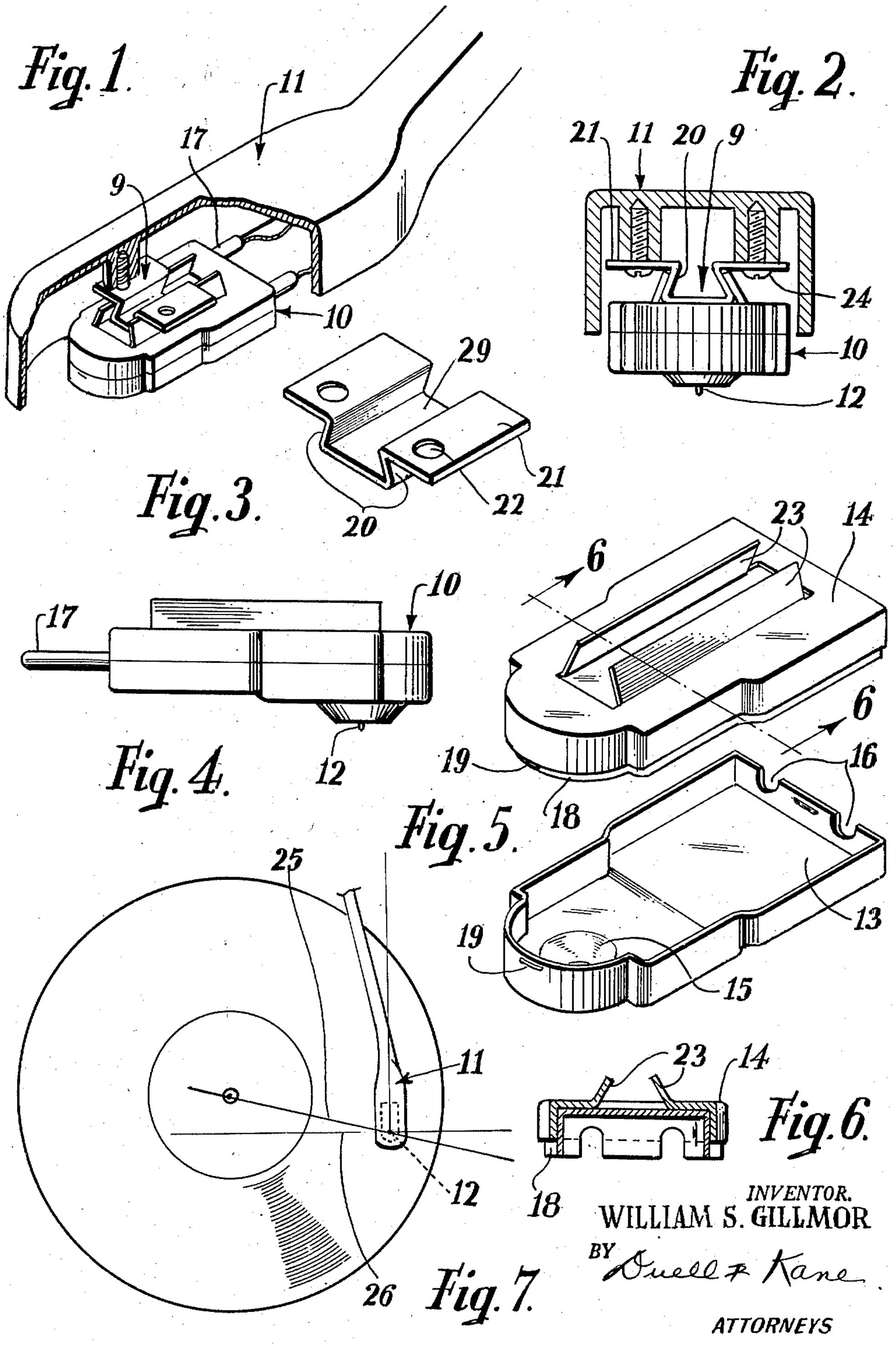
Fig. 1 is a partially fragmentary perspective view of the end of a pick-up arm having a reproducer unit or cartridge with my improved attaching device.
Fig. 2 is a partially sectional and partially elevational view showing the pickup arm, reproducer unit, and attaching device.
Fig. 3 is a perspective view of the clip portion of the attaching device.
Fig. 4 is a side elevational view of a reproducer unit having one portion of the attaching device on its upper surface.
Fig. 5 is a perspective view of the two sections of the casing of the reproducer unit shown in Figs. 1, 2 and 4 and showing the casing empty and in open position.
Fig. 6 is a sectional view of the upper casing section in the direction of the arrows on the line 6—6 of Fig. 5.
Fig. 7 is a plan view of a disk type record and sound pick-up arm and illustrating the tracking angle.

In the accompanying drawing my invention is illustrated in the form of attaching device 9 securing a sound reproducer unit or cartridge 10 to pick-up arm 11.

The construction and design of both the reproducer unit and the pick-up arm may vary considerably. The unit 10 is one compact type of unit or cartridge consisting of a casing with a stylus 12 projecting downwardly therefrom. The stylus is part of a moving system in any known type of reproducer (not shown) such as the electro-magnetic sound reproducer shown in the co-pending patent application Serial No. 681,800 for Sound Reproducer, filed by Norman C. Pickering on July 8, 1946.

The casing for holding the unit may be formed from a pair of complementary sections 13 and 14 which are adapted to fit together in the manner shown, to encase the unit. The lower section 13 is formed with a bottom portion having an aperture adjacent which it is dimpled as at 15 formed therein to accommodate the stylus and with side walls integral with the bottom section. The side walls at the rear of the casing may be formed with apertures 16 to accommodate the prongs or contacts 17 for electrically connecting the reproducer unit to an amplifier in the usual manner.

The upper section 14 of the casing is formed of inner and outer shells as shown. The inner shell projects downwardly beyond the outer shell as shown at 18 providing a stepped ledge or rim adapted to be inserted into the lower section 13 in assembling the casing. The two sections of the casing may be formed with interengaging lugs and recesses as indicated at 19 for frictionally retaining them in assembled relationship.

The fastening device 9 consists of two interengageable members—one for attachment to the pick-up arm and the other attached to the reproducer cartridge. The fastening member which is attached to the pick-up arm is in the form of a clip 29 having reversely tapered, or outwardly inclined, substantially parallel side walls 20. It also is provided with horizontal attaching plates 21 having apertures 22 therein. The apertures 22 are large enough to accommodate screws up to the largest size normally required for attachment to the popular, commercially available pick-up arms.

The fastening member which is secured to the reproducer cartridge 10 is in the form of a pair of substantially parallel inwardly inclined resilient tracks or guideways 23, which, as shown, may be formed integral with the outer shell of the casing section 14. As shown, the guideways are formed parallel with the longitudinal axis of the cartridge unit. Also, they are formed to frictionally engage the outer surfaces of the side walls 20 of the clip and they are substantially longer than the side walls of the clip, so as to permit longitudinal adjustment between the reproducer cartridge and the pick-up arm.

In applying my device to a pick-up arm the old reproducer cartridge is first removed. Clip 29 is then attached to the pick-up arm, by means of suitable screws 24, preferably using the threaded attachment apertures which are provided. Thereafter, the cartridge is arranged with its forward portion toward the outer end of the pick-up arm and the guideways 23 are interengaged with the side walls of the clip. The elongated guideways permit relative movement between the cartridge and the pick-up arm along the longitudinal axis of the cartridge. This is for the purpose of adjustment between the cartridge and the pick-up arm so as to obtain the desired tracking angle. The tracking angle is the angle between a radius of the record at the stylus point and a line perpendicular to the axis of the pick-up cartridge. This is illustrated in Fig. 7 in which the radius is indicated by the line 25 and a line perpendicular to the axis of the pickup cartridge is illustrated by the line 26. When the reproducer cartridge has been attached by means of the fastening device, it is shifted so as to obtain the proper tracking angle for any particular installation. When thus applied, the frictional engagement between the resilient inclined guideways 23 and the side walls of clip 19 serve to retain the reproducer cartridge in proper, adjusted position.

It will be seen that I have provided an improved attaching device for phonograph reproducer units or cartridges whereby the units may be applied to pick-up arms of many different sizes, shapes and types and the arrangement is such that it is adapted for use with a large variety of pick-up arms and provides for a relatively wide range of adjustment whereby tracking error can be minimized, and the desired tracking angle can be readily obtained. Modifications may be made in the illustrated embodiment of my invention without departing from the invention as set forth in the accompanying claim.

I claim:

A device for adjustably attaching a phonograph reproducer cartridge to a pick-up arm and comprising a fastening member in the form of a clip having outwardly inclined substantially parallel side walls connected by a flat transverse plate and having means for attaching it to a pick-up arm so that the said side walls extend longitudinally of the pick-up arm and a second fastening member in the form of a pair of inwardly inclined resilient substantially parallel guideways fixedly formed on the phonograph reproducer cartridge substantially parallel to the longitudinal axis thereof with the surface of the cartridge between the guideways being substantially flat, the guideways being of a size and shape to frictionally engage the side walls of the clip with the flat transverse plate of the clip in engagement with the flat cartridge surface and the guideways being relatively longer than the side walls of the clip so that the reproducer cartridge may be axially adjusted with respect to the pick-up arm to vary the tracking angle.

WILLIAM S. GILLMOR.

REFERENCES CITED

The following references are of record in the file of this patent:

UNITED STATES PATENTS

| Number | Name | Date |
|---|---|---|
| 1,761,831 | Hough | June 3, 1930 |
| 2,066,205 | Keating | Dec. 29, 1936 |
| 2,230,865 | Hutter | Feb. 4, 1941 |
| 2,453,894 | Chorpening | Nov. 16, 1948 |

FOREIGN PATENTS

| Number | Country | Date |
|---|---|---|
| 315,951 | Great Britain | July 25, 1929 |
| 368,035 | Italy | Feb. 8, 1939 |